United States Patent [19] [11] 3,963,555
Zweig [45] June 15, 1976

[54] METHOD AND APPARATUS FOR EDGE GLUING

[75] Inventor: Arnold A. Zweig, Olympia, Wash.

[73] Assignee: Simpson Timber Company, Seattle, Wash.

[22] Filed: Dec. 28, 1973

[21] Appl. No.: 429,267

[52] U.S. Cl. .............................. 156/358; 156/258; 156/263; 156/264; 156/304; 156/312; 156/512; 156/517; 156/558; 156/559; 156/580

[51] Int. Cl.² .............................. B32B 31/00

[58] Field of Search .......... 156/157, 159, 256, 258, 156/263, 264, 304, 312, 324, 358, 510, 512, 517, 535, 544, 546, 554, 555, 558, 566, 559, 578, 580; 198/21, 34, 37, 76

[56] References Cited

UNITED STATES PATENTS

| | | | |
|---|---|---|---|
| 2,488,759 | 11/1949 | Bolling | 156/558 |
| 2,771,923 | 11/1956 | Torwegge et al. | 156/558 X |
| 3,003,541 | 10/1961 | Prentice et al. | 156/263 |
| 3,565,236 | 2/1971 | Southworth et al. | 198/34 |

*Primary Examiner*—William A. Powell
*Assistant Examiner*—Brian J. Leitten
*Attorney, Agent, or Firm*—Seed, Berry, Vernon & Baynham

[57] ABSTRACT

A drive arrangement pressurizing system and method for a veneer edge gluer apparatus having a low pressure, constant-drive infeed crowder section and a high pressure intermittent-drive outfeed crowder section for producing a continuous veneer ribbon which is moved in a straight line path of travel as it issues from the edge gluer.

8 Claims, 3 Drawing Figures

METHOD AND APPARATUS FOR EDGE GLUING

BACKGROUND OF THE INVENTION

The present invention relates to the art of joining the individual pieces of sheet material capable of being bonded along their abutting edges, parallel to the grain to form a continuous web which may then be cut into desirable lengths for further use. The most common application of this type of apparatus is in the production of composite veneer sheets which are used in the manufacture of polywood panels. The composite veneer sheet is made up of random width veneer pieces which are edge glued to form a continuous ribbon of veneer which is then clipped in suitable lengths to form 4 × 8 panels for instance.

As commonly practiced, this process includes the steps of jointing or edge trimming at least one edge of the veneer pieces, applying a coating of adhesive such as contact cement on the edges and then placing the veneer pieces in edge-abutting relationship while pressuring or crowding the pieces against one another as they are moved along a line of travel. A conventional guillotine clipper is usually located at the outfeed end of the crowder and serves to cut the continuous ribbon into usable size sheets. The individual veneer pieces are not perfectly rectangular but are more often trapezoidal as is the resulting composite sheet.

With conventional equipment, the individual pieces enter the crowder line which has at least two sections comprising the infeed and the outfeed sections. The infeed crowder section has upper and lower chains, or the equivalent, contacting the surfaces of the veneer pieces and are held under considerable pressure while being continuously driven. In order to provide the crowding action, the outfeed crowder chains are provided with a lower pressure acting on the upper and lower faces of the pieces and have no positive drive. This arrangement causes the incoming veneer pieces to be moved against the preceding pieces as they are pushed through the outfeed section.

The conventional edge gluing process as described results in significant veneer waste which the present invention is successful in alleviating. Since, as explained, the individual veneer pieces are not exactly rectangular and are more often trapezoidal, the incoming veneer piece which is positively gripped by the infeed crowder chains is forcefully moved forward and is not allowed to move at all in a lateral direction. Since the outfeed chain section places very slight pressure on the faces of the moving veneer ribbon, the effect is that the incoming veneer piece is held rigid while the ribbon is caused to move laterally one way or the other as the slanted edge of the incoming piece is mated against the end of the ribbon. This movement can be visibly observed as the ribbon continues to move and may be in the neighborhood of a couple of inches, first to one side and then to the other. The result is that the clipper does not clip off a rectangular 4 × 8 veneer sheet as intended but, instead, because of the "snaking" of the ribbon, cuts a more or less trapezoidal composite sheet. The result is that a wedge of from 2½ to 3½ inches of veneer is usely wasted on each sheet because it is not square. Over a years period, this waste in a typical plywood mill may represent several hundred thousand dollars loss because of the present high price of veneer. In the event that trimming saws are used, the weaving or snaking of the ribbon as it issues from the crowder mill also cause severe binding. The result of such binding may be that of splitting or crumpling the thin veneer sheet.

SUMMARY OF THE INVENTION

According to the present invention, the problems discussed relative to the conventional edge gluing equipment are alleviated by providing a novel drive arrangement and crowder chain pressuring system which results in a straight line flow of the continuous veneer ribbon as it issues from the outfeed section of the crowder regardless of the irregular shape of the incoming veneer pieces. Although the inventive concept of the present invention may be applied to the manufacture of many types of composite sheets, the preferred embodiment described herein is directed to plywood veneer production and the crowder or edge gluer equipment referred to are well known pieces of equipment, the operation of which is understood by those skilled in the art. According to the present invention, an infeed conveyor moves the individual veneer pieces from the jointer to the constantly driven infeed crowder section which has a relatively low pressure system acting against the upper and lower faces of the veneer pieces. The infeed conveyor ahead of the infeed crowder section, is constantly driven at substantially the same speed as the infeed crowder section and has no significant pressure. The pressure exerted on the faces of the veneer piece by the outfeed crowder section is, in the present instance, greater than the pressure exerted by the infeed crowder section. Since the greater pressure is on the outfeed section, it is necessary to intermittently drive the outfeed section to keep the ribbon moving. The outfeed drive is controlled by a sensing device responsive to the movement of veneer pieces into the infeed section. With this arrangement, the veneer ribbon which is formed in the outfeed crowder section is not allowed any lateral movement at all. Instead, the incoming veneer piece with the slanting edge will shift laterally as necessary in order to abut its leading edge with the trailing edge of the ribbon. Thus, instead of the incoming veneer piece moving the entire ribbon as in the prior art, the incoming veneer piece itself moves and the ribbon travels in a straight line direction. This action also eliminates the saw tooth edge which normally resulted in the prior art edge gluing apparatus. As may be appreciated, the straight line movement of the ribbon also allows the clipper to form substantially rectangular 4 × 8 sheets with little or no loss resulting from non-parallel edges. Such regularly shaped sheets are also better adapted for further handling, as for instance stacking, wherein damage loss is prevented.

The primary object of the present invention, therefore, is to provide a drive arrangement and pressurizing system for conventional edge gluer apparatus which eliminates lateral movement of the composite ribbon regardless of irregularities in the individual pieces.

Another object of the present invention is to provide a drive arrangement and pressurizing system for an edge gluer, as described, for producing substantially rectangular composite sheets.

Still another object of the present invention is to provide a drive arrangement of the character described which eliminates binding and irregular edges on the composite ribbon as it issues from the crowder.

DESCRIPTION OF THE PREFERRED EMBODIMENT

Figure 1:
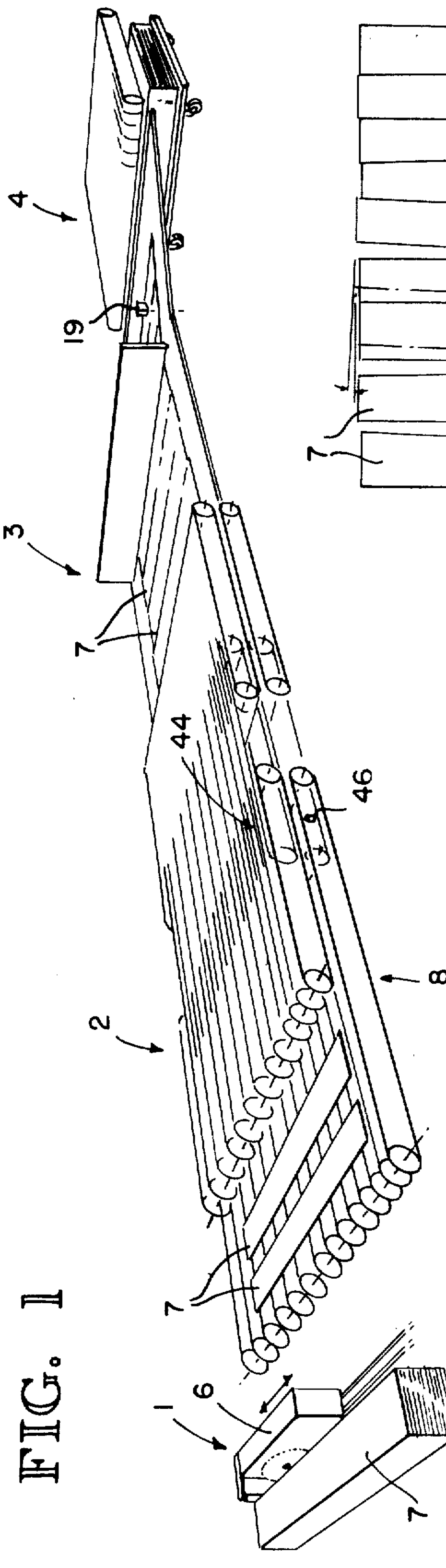
FIG. 1 is a schematic in perspective showing the crowder line incorporating the present invention.

Referring to the drawings wherein like reference numerals indicate identical parts in the various views, FIG. 1 shows a typical continuous line for producing composite veneer sheets. The line includes a conventional jointer 1, the crowder 2, a clipper 3 and a veneer sheet stacker 4. Except for the crowder 2, the remaining units of equipment making up the line as just described, are conventional pieces of equipment known to the industry and no attempt will be made to describe the details of their operation. Generally speaking, the jointer 1 includes a traversing unit 6 with a trimmer saw for trimming the edges of the stack of veneer pieces, and means for applying a coating of adhesive to the trimmed edges. The random width veneer pieces are then hand fed to the infeed conveyor portion 8 of the crowder. The edge gluer-crowder apparatus, as will presently be described in detail, serves to bring the veneer pieces 7 into tight edge-to-edge abutment and hold them in this position while they are fed in a straight line path of travel so as to issue therefrom as a single ribbon of veneer. The clipper 3 shown schematically may comprise any well known guillotine type cutter or its equivalent, the operation of which will be timed with the outfeed movement of the veneer ribbon so as to cut the ribbon into veneer sheets as for example approximately 4 × 8 for plywood panel layup. As the sheets are clipped, they are fed to a conventional veneer stacker 4, the operation of which may be controlled by a sensor such as the contact switch 9. One form of veneer stacker is that disclosed in U.S. Pat. No. 3,395,915 which may be controlled in any well known fashion so as to receive the composite veneer sheet and form neat stacks.

Figure 2:
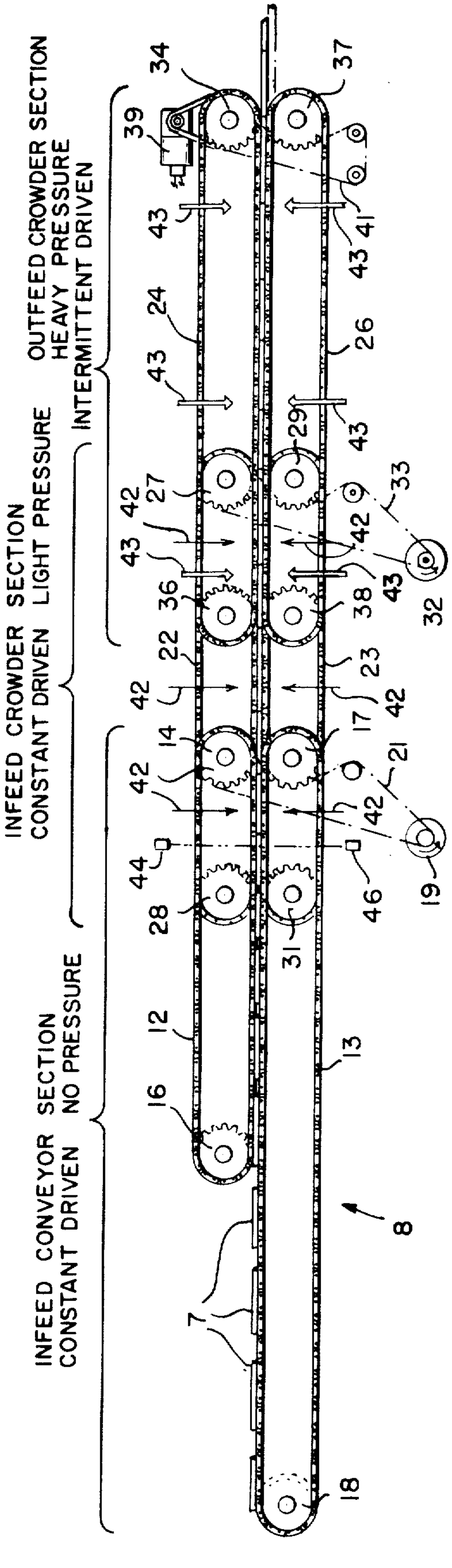
FIG. 2 is a schematic side elevation of the crowder mechanism.

Referring more particularly to FIG. 2, the modification to the edge gluer-crowder will now be described in detail. The infeed conveyor 8 may be any conventional conveyor system utilizing endless belts commonly known in the art and will include an upper group of conveyor members 12 and a lower group of conveyor members 13. Although the size of the conveyor may vary, it will normally be designed to handle an 8 foot span of veneer. The upper group of conveyors 12 are trained about the drive and idler wheels or sprockets 14 and 16 respectively and the lower group of conveyors 13 are trained about the drive and idler sprockets or wheels 17 and 18 respectively. A constant drive for the conveyor section is provided by a drive means such as an electric motor or the like indicated schematically as 19, which drives the sprockets 14 and 17 through a drive belt or chain 21 as the case may be. The upper and lower groups of conveyor members 12 and 13 have no pressurizing means but are fixed in their position and are spaced so as to lightly contact the individual veneer sheets 7 and move them into the infeed crowder section as will presently be explained. The contact between the conveyor members and the veneer pieces is such that the conveyor members will slip on the surfaces of the veneer pieces in the event any obstruction is encountered.

The infeed crowder section comprises an upper and lower group of endless members such as chains or belts 22 and 23 respectively and the outfeed crowder section comprises similar upper and lower conveyor members are driven by a common drive in both instances with a separate drive being provided for each of the crowder sections. The upper infeed crowder members 22 are trained about the sprockets or wheels 27 and 28 and the lower infeed crowder members 23 are trained about the sprockets or wheels 29 and 31. As illustrated in FIG. 2, the upper and lower parts of the infeed crowder section overlap the upper and lower portions of the infeed conveyor such that constant contact is maintained with the veneer pieces as they move forward. The drive means for the infeed crowder section is indicated at 32 and may constitute a constant speed electric motor or the equivalent which drives the sprockets 27 and 29 through a chain or belt 33. The speed of the infeed conveyor and infeed crowder section may be synchronized in order to provide uninterrupted movement of the veneer.

The uper members 24 of the outfeed crowder section are trained about the drive and idler sprockets 34 and 36 respectively and the lower members are trained about the sprockets 37 and 38 respectively with the drive sprockets 34 and 37 being driven by the intermittent drive air motor 39 through the chain 41. The structural details involved in the infeed and outfeed crowder sections for edge gluing apparatus from no part of the present invention and are well known in the art, hence it is not deemed necessary to show such structural detail in this application. Reference may be had to U.S. Pat. Nos. 3,003,541 and 3,021,248, the disclosures of which are included herein and made a part hereof by reference, as illustrating examples of such devices.

In normal practice, upper and lower sets of endless crowder members such as 22–23, and 24–25 are provided with means to apply pressure against the upper and lower surfaces of a moving veneer sheet or piece. This expedient is also common knowledge in the art and may be accomplished by either hydraulic, pneumatic or mechanical means. The details thereof are therefore omitted from this disclosure for simplicity and and ease of understanding of the concept of the present invention. The above referred to U.S. patents as well as U.S. Pat. Nos. 2,567,160 and 3,579,405 all show various common means for pressurizing the upper and lower portions of the endless crowder member. In the present case, the pressurizing means has been schematically illustrated for the members 22 and 23 by means of the vertically directed single line arrows 42 in FIG. 2. The pressurizing means for the outfeed crowder members 24 and 26 is illustrated by the vertically directed double line arrows 43 in FIG. 2. First with regard to the pressurizing means for the members 22 and 23, this pressure will be adjusted such that very light pressure will be applied to the surfaces of the veneer sheets with the endless members being capable of slippage on the surfaces of the veneer pieces when their forward travel is haulted. A much higher relative pressure will be maintained on the outfeed members 24 and 26 such that the veneer pieces are positively gripped and held against any lateral movement relative thereto.

The drive motor 39 constitutes a conventional variable-torque, load-responsive pneumatic motor. The motor will be connected to a suitable source of air pressure with a solenoid operated control valve (not shown) to control the operation of the motor. The solenoid valve is connected to be controlled by a photo electric sensor device constituting a light source 44 and a photo cell 46 of conventional design. The photo cell will be electrically connected such that the solenoid valve will supply pressure to the motor 39 as long as the beam is broken. When the beam is completed because of the absence of a veneer piece entering the infeed crowder section, the air motor drive is interrupted. The speed of the drive to the outfeed section of the crowder provided by the motor 39 will be adjusted so that light abutting edge pressure is created between the abutting veneer pieces as they are moved from the infeed section of the crowder to the outfeed section. In the event that the drive for the outfeed section is interrupted because of the absence of an incoming veneer piece, the infeed crowder chains will merely slip on the surface of the veneer pieces already abutted without harm to the veneer surface.

Figure 3:
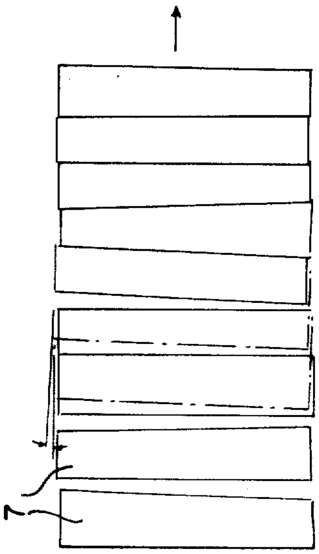
FIG. 3 is a plan view illustrating the formation of a straight line ribbon as it moves through the crowder mechanism.

With the structure described, and with specific reference to FIG. 3 of the drawings, it will be apparent that, since the endless members of the outfeed crowder section firmly grip the abutted and bonded veneer pieces, these joined pieces move in a positive straight line path in the direction of the arrow, with no lateral movement being allowed. On the other hand, the infeed crowder chains, which operate constantly, permit the incoming veneer piece with a slanted edge to be moved up steadily to the preceding veneer piece and allow the piece enough lateral movement or shifting in order to mate the abutting edges. In this manner, as shown in FIG. 3, the incoming pieces orient themselves to mate with the trailing end of the ribbon as distinguished from the prior art wherein the incoming pieces were held rigidly while the issuing ribbon weaved back and forth in order to mate the abutting edges. Thus, with the present method, the issuing ribbon of veneer approaches the clipper in a straight line path allowing the clipper to cut the composite sheets with substantially parallel leading and trailing edges. The advantages of this method of producing and clipping the composite ribbon have been outlined and lie primarily in the fact that waste, due to the necessity of trimming irregular veneer sheets is eliminated. The additional factors of preventing binding of trimming saws where such are used and permitting straight edge stacking of the veneer sheets further adds to the value of the concept and result in significant veneer savings.

From the foregoing, it will be apparent to those skilled in the art that the present drive arrangement and pressurizing system and method for edge gluing provides significant improvements over prior art equipment and methods with new and unobvious results. While a preferred embodiment of the invention has been described for purposes of illustration, modifications and variations are possible without departing from the inventive concept.

I claim:

1. A crowder mechanism for edge gluing individual sheets of material having non-parallel edges to form a continuous ribbon thereof which issues from the outfeed end of the crowder mechanism in straight line flow regardless of the irregular shape of the individual sheets fed into the infeed end of the crowder mechanism, comprising:

- a constantly driven infeed crowder section for conveying the individual sheets into edge abutting relationship with the trailing edge of the continuous ribbon being formed having first pressure means exerting a first pressure on the sheets sufficient to contact and convey the sheets but allowing lateral shift thereof as necessary in order for the leading edge of the sheet being conveyed to abut with the trailing edge of the ribbon being formed;
- an outfeed crowder section receiving the abutting individual sheets conveyed by the infeed crowder section having second pressure means acting against the upper and lower faces of the sheets sufficient to prevent any substantial lateral movement of the continuous ribbon being formed and conveyed;
- intermittent variable torque, load responsive drive means driving the outfeed crowder section at a speed to create light abutting edge pressure between the abutting sheets as they move through the infeed crowder section to the outfeed crowder section;
- sensing and signal means for sensing pressure of an individual sheet into the infeed crowder section; and
- means operating the intermittent drive means of the outfeed crowder section responsive to the sensing and signal means to interrupt operation of the outfeed crowder section in the absence of sheets entering the infeed crowder section.

2. The device according to claim 1 wherein said infeed and outfeed crowder sections have overlapping end portions for continuous contact with the advancing sheets.

3. The device according to claim 2 including; an infeed conveyor section for conveying sheet members into said infeed crowder section; said infeed conveyor having endless conveyor members for supporting and moving said sheets with overlapping end portions with said infeed crowder section, and drive means connected to drive said infeed conveyor section at substantially the speed of said infeed crowder section.

4. The device according to claim 3 wherein said intermittent drive means is a pneumatic motor and wherein said first pressure is low enough to permit slippage of said infeed crowder section on the surface of said sheets when said intermittent drive is not in operation.

5. In a crowder mechanism for advancement of individual sheets of material into edge abutment with preceding advancing sheets to form a continuous ribbon thereof, said crowder mechanism including:

- first and second sets of crowder members, each set including spaced apart upper and lower endless crowder members disposed above and below said advancing sheets with means to pressure said crowder members into contact with the surfaces of the sheets,
  - a drive and pressurizing system comprising:
    - first drive means connected to constantly drive said first set of upper and lower crowder members,
    - intermittent variable torque, load responsive drive means connected to drive the second set of upper and lower crowder members at a speed to create light abutting edge pressure between the abutting sheets as they move through the first set of crowder members to the second set of crowder members, sensing and control means responsive to the passage of sheets into said first set of crowder members for controlling the operation of said intermittent drive means so that said second set of crowder members is driven only upon passage of sheets into said first set of crowder members, first pressure means for exerting a first pressure on said first set of crowder members allowing lateral shift of the individual sheets of material as necessary for the leading edges of the sheets being conveyed to abut with the trailing edge of the continuous ribbon being formed, and second pressure means for exerting a second pressure in excess of said first pressure on the second set of crowder members, said second pressure being great enough to cause the associated upper and lower crowder members to firmly grip the advancing sheets so as to prevent lateral movement thereof during advancement, the continuous ribbon of sheet material issuing from the outfeed of the second set of crowder members in straight line movement.

6. The device according to claim 5 wherein; the upper and lower members of said first set of crowder members havve overlapping end portions with respective upper and lower crowder members of said second set for continuous contact with the advancing sheets.

7. The device according to claim 6 including; an infeed conveyor section for conveying sheet members into said first set of crowder members, said infeed conveyor having endless conveyor members for supporting and moving said sheets with overlapping end portions with said first set of crowder members and drive means connected to drive said infeed conveyor section at substantially the speed of said first set of crowder members.

8. The device according to claim 7 wherein said intermittent drive means is a pneumatic motor and wherein said first pressure is low enough to permit slippage of said first set of crowder members on the surface of said sheets when said intermittent drive is not in operation.

* * * * *